US012646085B2

(12) United States Patent
Bansal et al.

(10) Patent No.: US 12,646,085 B2
(45) Date of Patent: Jun. 2, 2026

(54) IDENTIFYING A TECHNOLOGY USED BY A USER

(71) Applicant: 6SENSE INSIGHTS, INC., San Francisco, CA (US)

(72) Inventors: Tarun Bansal, Delhi (IN); Anurag Bhatt, Bengaluru (IN); Rahul Bhattacharya, Bangalore (IN); Deepak Anchala, San Jose, CA (US); Gajanan Sabhahit, Bangalore (IN); Sarthak Gupta, Palampur (IN); Shubham Gupta, Bangalore (IN); Rahul Kumar Singh, Bengaluru (IN); Tanuj Prakash, Bengaluru (IN)

(73) Assignee: 6SENSE INSIGHTS, INC., San Francisco, CA (US)

( * ) Notice: Subject to any disclaimer, the term of this patent is extended or adjusted under 35 U.S.C. 154(b) by 0 days.

(21) Appl. No.: 18/829,005

(22) Filed: Sep. 9, 2024

(65) Prior Publication Data

US 2025/0086664 A1 Mar. 13, 2025

(30) Foreign Application Priority Data

Sep. 8, 2023 (IN) .............................. 202321060478

(51) Int. Cl.
| | |
|---|---|
| *G06Q 30/0201* | (2023.01) |
| *G06F 16/28* | (2019.01) |
| *G06N 5/02* | (2023.01) |

(52) U.S. Cl.
CPC ....... *G06Q 30/0201* (2013.01); *G06F 16/285* (2019.01); *G06N 5/02* (2013.01)

(58) Field of Classification Search
CPC .. G06Q 30/0201; G06Q 30/02; G06Q 10/105; G06F 16/285; G06N 5/02
See application file for complete search history.

(56) References Cited

U.S. PATENT DOCUMENTS

| | | | | |
|---|---|---|---|---|
| 7,555,441 | B2 * | 6/2009 | Crow ..................... | G06Q 10/10 |
| | | | | 705/7.14 |
| 10,796,229 | B1 * | 10/2020 | Paliwal .................. | G06N 5/022 |
| 10,956,414 | B2 | 3/2021 | Le et al. | |
| 2006/0004716 | A1 * | 1/2006 | Hurst-Hiller ....... | G06F 16/9535 |
| 2010/0114789 | A1 | 5/2010 | Dane | |
| 2018/0129714 | A1 * | 5/2018 | Saxena ........... | G05B 19/41845 |
| 2019/0220875 | A1 | 7/2019 | Fatemi | |
| 2021/0374196 | A1 * | 12/2021 | Gao ..................... | G06F 16/951 |

* cited by examiner

*Primary Examiner* — Rutao Wu
*Assistant Examiner* — Tyrone E Singletary
(74) *Attorney, Agent, or Firm* — Procopio, Cory, Hargreaves & Savitch LLP

(57) ABSTRACT

A system and a method to determine a technology used by a user is disclosed. The system receives user data comprising job titles, skills, and job summaries. Further, technology categorization data is generated based on the user data. The technology categorization data comprises technology category and technology subcategory mapped to a user department and a user division. The system further extracts a keyword and a set of buffer keywords from the user data. Subsequently, the system determines a context of the user data based on the set of buffer keywords of the keyword. The technology used by the user may be determined upon comparing the keyword and the context with a predefined pattern sheet. The system validates the technology with the technology categorization data.

5 Claims, 8 Drawing Sheets

200

| Technology | Patterns | | | |
|---|---|---|---|---|
| | Pattern 1 | Pattern 2 | Pattern 3 | Pattern 4 |
| Technology A | Technology A | Technology A && Logistics | Technology A && Supply Chain | |
| | | | | |
| Technology B | Tech B | Technology B && event | Technology B && meeting | Technology B &&virtual |
| | | | | |
| Technology C | Tech-C | Technology C && Account Engagement | Technology C && Lead | Engagement |
| | | | | |
| Technology D | Technology D | Technology D && Robotics | Technology D && Electronics | Technology D ~ supply chain ~ logistics |

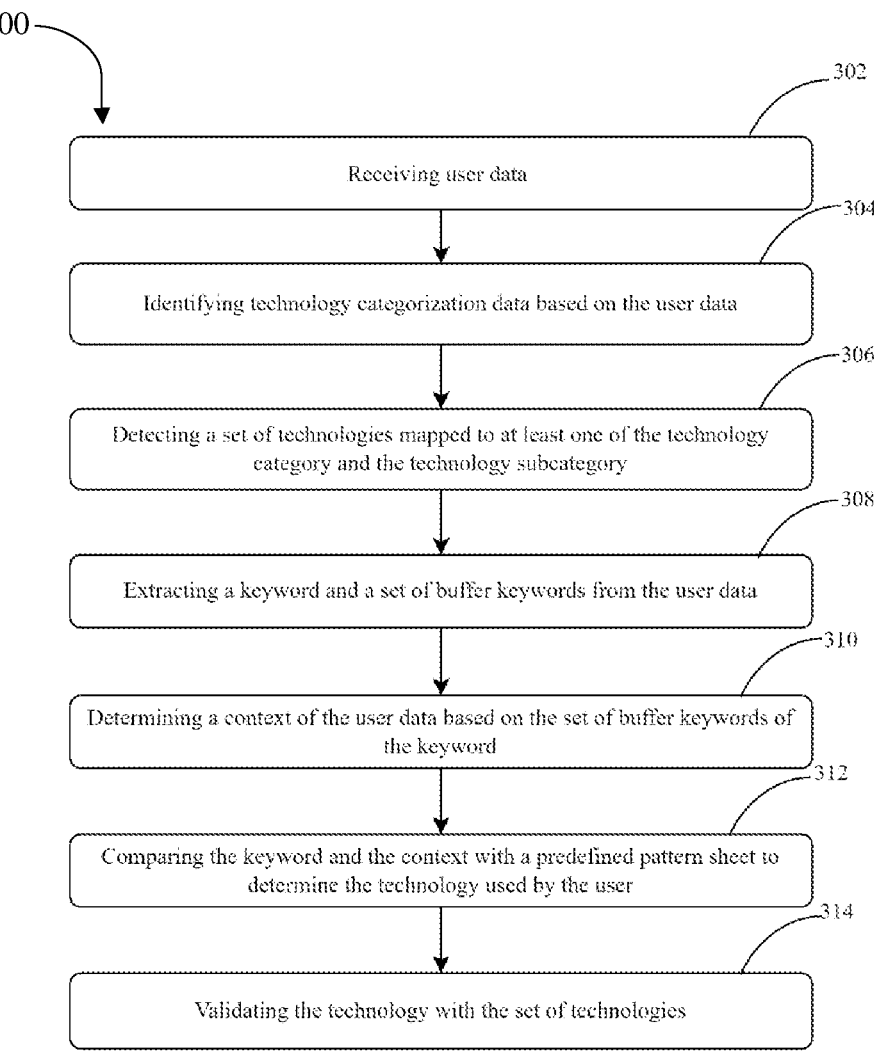

302

Receiving user data

304

Identifying technology categorization data based on the user data

306

Detecting a set of technologies mapped to at least one of the technology category and the technology subcategory

308

Extracting a keyword and a set of buffer keywords from the user data

310

Determining a context of the user data based on the set of buffer keywords of the keyword

312

Comparing the keyword and the context with a predefined pattern sheet to determine the technology used by the user

314

Validating the technology with the set of technologies

Receiving user data

404

Extracting a keyword and a set of buffer keywords from the user data, wherein the keyword corresponds to a technology

406

Determining a context of the user data based on the set of buffer keywords of the keyword

408

Comparing the keyword and the context with a predefined pattern sheet to determine the technology used by the user

500

600

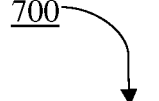
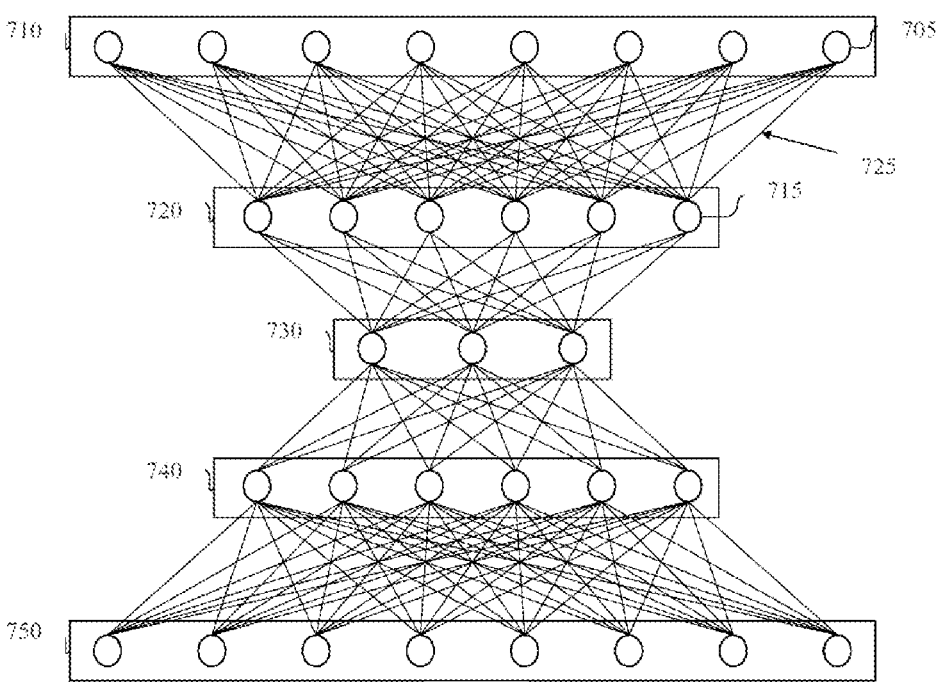
Figure 7

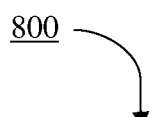

800

| USER | | Technology | | | | | |
|---|---|---|---|---|---|---|---|
| Department | Division | Category 1 | Sub-Category 1 | Category 2 | Sub-Category 2 | Category 3 | Sub-Category 3 |
| HR | Learning And Development | HR | Employee Engagement | HR | Internal Knowledgebase | HR | Learning Management Systems |
| HR | Talent Acquisition | HR | Talent Management | HR | Employment Background Checks | HR | Interview Scheduling |
| Marketing | Advertising And Promotions | Marketing | Advertising Optimization | Marketing | Display Advertising | Marketing | Mobile Advertising |
| Marketing | Content Marketing | Marketing | Content Discovery Platform | Marketing | Content Marketplace | Marketing | Interactive Content Marketing |
| Marketing | Email And Social Media Marketing | Marketing | Direct Mail And Snail Mail Marketing | Marketing | Social Media Archiving | Marketing | Social Analytics |
| Marketing | SEO | Marketing | SEO And SEM | Marketing | SEO Services | Marketing | SEO Platform |
| Technology | Product Management | Product And Design | Mockups, Wireframing And Prototyping | Product And Design | Agile Project Management | Product And Design | Project Management |
| Technology | Design And Experience | Customer Management | User Feedback Management | Business Intelligence And Analytics | Heatmaps | Business Intelligence And Analytics | Heatmaps |

Figure 8

IDENTIFYING A TECHNOLOGY USED BY A USER

CROSS-REFERENCE TO RELATED APPLICATIONS

The present application claims priority from Indian Patent Application number 202321060478 dated Sep. 8, 2023.

TECHNICAL FIELD

The present subject matter described herein, in general, relates to identifying a technology used by a user.

BACKGROUND

In today's digital age, an overwhelming amount of data is readily available on the internet. This data can be a valuable resource for organizations looking to reach potential clients with their product or service offerings. However, due to its unstructured and diverse nature, it can be difficult and time-consuming for sales and marketing teams to identify and target the right customers. This can result in wasted efforts and resources on pursuing leads that may not be interested in the organization's offerings. While third-party services are available to help with lead generation, these typically rely on manual methods such as speed networking, trade fairs, and conferences. Therefore, there remains a clear need for an improved method to help sales and marketing teams more effectively identify and pursue leads for their organization.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for determining technology used by a user. This summary is not intended to identify essential features of the claimed subject matter nor is it intended for use in determining or limiting the scope of the claimed subject matter.

In one implementation, a method for determining a technology used by a user is disclosed. The method may comprise receiving user data comprising job titles, skills, and job summaries. Subsequently, technology categorization data may be identified based on the user data. It may be noted that the technology categorization data comprises a technology category and a technology subcategory. Further, a set of technologies mapped to at least one of the technology category and the technology subcategory may be detected. Furthermore, a keyword and a set of buffer keywords may be extracted from the user data. It may be noted that the keyword corresponds to a technology. Subsequently, a context of the user data based on the set of buffer keywords of the keyword may be determined. Further, the keyword and the context may be compared with a predefined pattern sheet to determine the technology used by the user. The predefined pattern sheet may comprise one or more prestored keyword patterns representing the technology. Furthermore, the technology may be validated with the set of technologies. In one aspect, the aforementioned method for determining technology used by a user may be performed by a processor using programmed instructions stored in a memory.

In another implementation, a non-transitory computer program product having embodied thereon a computer program to determine a technology used by a user. The program may comprise a program code for receiving user data comprising job titles, skills, and job summaries. Further, the program may comprise a program code for identifying technology categorization data based on the user data. The technology categorization data may comprise a technology category and a technology subcategory. Further, the program may comprise a program code for detecting a set of technologies mapped to at least one of the technology category and the technology subcategory. Furthermore, the program may comprise a program code for extracting a keyword and a set of buffer keywords from the user data. It may be noted that the keyword may correspond to a technology. Subsequently, the program may comprise a program code for determining a context of the user data based on the set of buffer keywords of the keyword. Further, the program may comprise a program code for comparing the keyword and the context with a predefined pattern sheet to determine the technology used by the user. The predefined pattern sheet comprises one or more prestored keyword patterns representing the technology. Finally, the program may comprise a program code for validating the technology with the set of technologies.

BRIEF DESCRIPTION OF THE DRAWINGS

The foregoing detailed description of embodiments is better understood when read in conjunction with the appended drawings. For the purpose of illustrating the present subject matter, an example of a construction of the present subject matter is provided as figures, however, the invention is not limited to the specific method and system for determining technology used by a user disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

FIG. 2 illustrates an example of the predefined pattern sheet for determining technologies used by a user, in accordance with an embodiment of the present subject matter.

FIG. 3 illustrates a method for determining a technology used by a user, in accordance with an embodiment of the present subject matter.

FIG. 7 illustrates an example artificial neural network, in accordance with an embodiment of the present subject matter.

FIG. 8 illustrates an example of technology categorization data for determining technologies used by a user, in accordance with an embodiment of the present subject matter.

Figure 1:
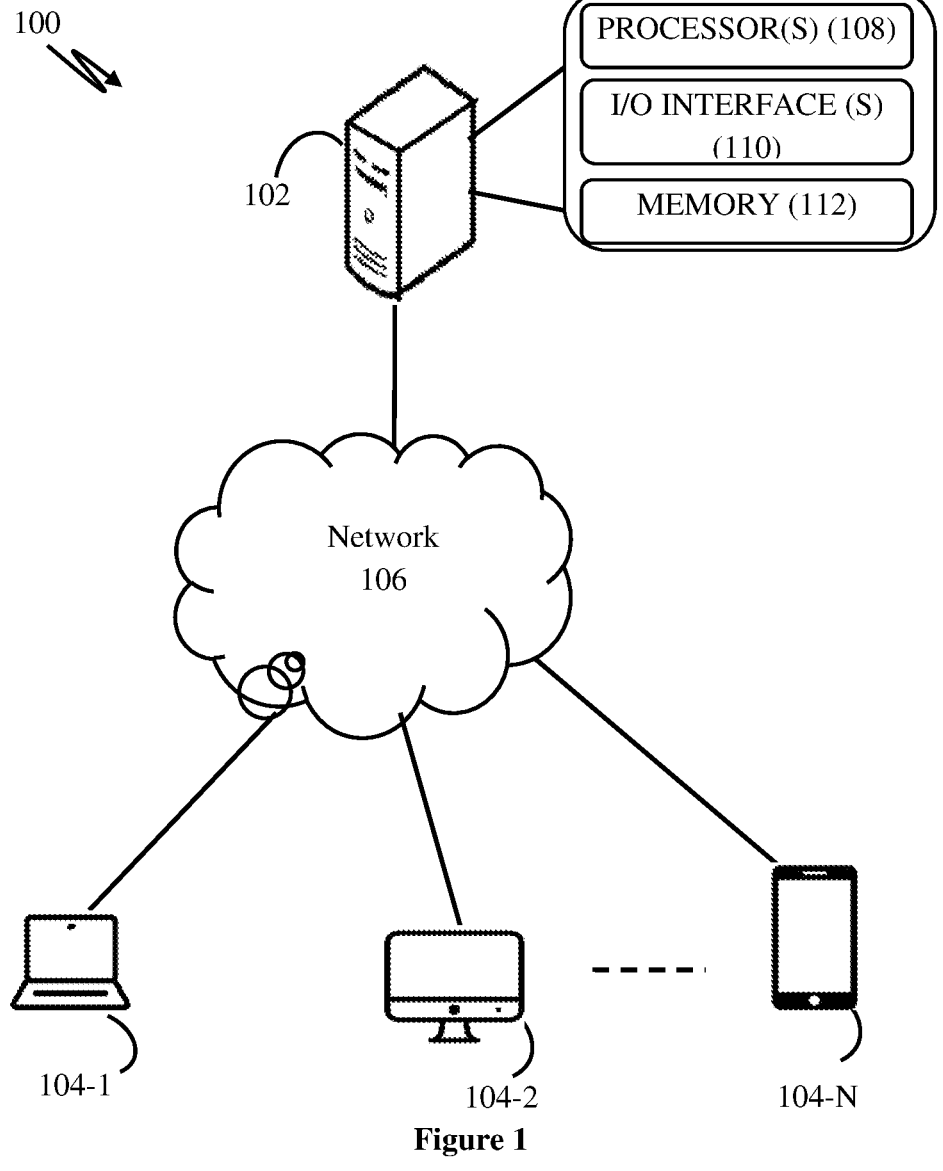
FIG. 1 illustrates a network implementation for determining a technology used by a user, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "identifying," "detecting," "extracting," "determining," "comparing," "validating," and other forms thereof, are intended to be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The term "technographics," as used hereinafter, is a combination of the word "technology" and "demographics." Simply put, technographic data is defined as information regarding the various technologies used by a user or people over a period of time. Based on the technographic data of the users, insights may be drawn that help businesses identify users that are most likely to convert based on the knowledge of the current technology stack. In other words, technographic data helps to understand the technology and tools used by users. The technographic data may also include information such as the date from which a user started using a particular technology (e.g., software) and in which company the user was employed at that time. Thus, helping the marketing team or sales team to effectively market to the users that are most likely to convert based on their current technology stack.

The present subject matter discloses a method and a system for determining a technology used by the user. The system receives user data comprising job titles, skills, and job summaries. Further, technology categorization data based on the user data is identified. It may be noted that the job titles may be mapped to the technology categorization data. The technology categorization data is prestored in the system. The technology categorization data comprises a technology category and a technology subcategory mapped to a user department and a user division. Further, the system detects a set of technologies mapped to at least one of the technology category and the technology subcategory. Furthermore, the system extracts buffer keywords along with the keywords. The system determines the context of the user data based on the set of buffer keywords of the keyword. Further, the technology used by the user is determined upon comparing the keyword and the context with a predefined pattern sheet.

The present subject matter describes various approaches for determining at least one technology being used by one or more users. More specifically, the present subject matter facilitates determining a technology or a technology stack or technographics being used by user without employing large computational resources and in a time efficient manner.

Referring now to FIG. 1, a network implementation 100 of a system 102 for determining a technology used by a user is disclosed. Initially, the system 102 receives user data comprising job titles, skills, and job summaries. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives user data comprising job titles, skills, and job summaries from one or more user devices 104. Further, the system 102 may also receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, Local Area Network (LAN), Wide Area Network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an Input/Output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for determining technographics used by a user. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter discloses the system 102 to determine a technology used by a user. The system 102 receives user data comprising job titles, skills, and job summaries. The user data may also be referred to as people profile data. The user data may comprise at least a current work profile and past work profiles of the user. It may be noted that the system receives the user data of a set of users (for e.g. user data of 10,000 users). Further, each user of the set of users may have different job titles, skills, and job summaries.

Further to obtaining the user data, the system 102 may clean the user data by using data cleaning techniques. In an embodiment, the system 102 may remove the special characters (e.g., Exclamation mark, Hyphen, Underscore, etc.) present in the user data.

In an embodiment, one or more job titles may be mapped to a user department and user division. For an example, job title "Web development" may be mapped to division "IT" and department "Design and Experience." A database of one or more job titles mapped to the user division and department may be stored in the memory 112.

Further to cleaning the user data, the system 102 may identify technology categorization data based on the user data. The technology categorization data may comprise a technology category and a technology subcategory mapped to a user department and a user division. The technology categorization data is prestored in the system. Referring to FIG. 8, an example of technology categorization data 800 is illustrated. The technology categorization data may comprise a user department and a user division mapped to a technology category and a technology subcategory. It may be noted that one or more technology categories and subcategories may be mapped to one user department and user division. In the example, it can be seen that for HR department, there are two divisions and one or more technology categories and subcategories mapped to each department and division. In another embodiment, the system may have a prestored set of technologies mapped to each technology category and technology sub-category. For an example, consider that for content discovery platform (technology sub-category), the system may comprise the prestored set of technologies such as Taboola®, Mix® and alike.

In an example the technology categorization data may be identified based on user data as below:

| Job Title | User Department | User Division | Technology Category | Technology Subcategory |
|---|---|---|---|---|
| Web Developer | IT | Design And Experience | Web Development | Frontend Development |
| Data Analyst | Finance | Bi And Analytics | Data Analysis | Business Intelligence |
| Mobile App Developer | IT | Product Management | Mobile Development | Native App Development |

In an example and not by way of any limitation, the system receives user data comprising a job title, skills, and job description. Based on the job title the system may identify the department and division of the user. Further, one or more technology categories and technology sub-categories may also be identified. The system comprises a database in which the job title is mapped to a user department and a user division. Further, the user department and the user division may be mapped to technology categories and subcategories.

Further to identifying technology categorization data, the system may detect a set of technologies mapped to at least one of the technology category and the technology subcategory. It may be noted that the system may comprise a set of technologies for each technology category and subcategory. The below table shows the set of technologies mapped to the technology category and the technology sub-category:

| Technology Category | Technology Subcategory | Technology |
|---|---|---|
| Communication | Video Conferencing | Zoom ® |
| Communication | Team Collaboration | Slack ® |
| Software Development | Programming Languages | C#, Java ® |
| Customer Relationship Management | Sales Management | Salesforce ® |
| Customer Relationship Management | Marketing Management | Zoho ®, Hubspot ® |
| Web Development | Front-end Frameworks | React ®, Angular ® |
| Web Development | Back-end Frameworks | Node.js ®, Django ® |

In another embodiment and not by way of any limitation, the technology generation model may be a rule-based model. The rule-based model may be configured in such a way that communication technologies such as Slack®, Teams®, and alike are standard across all departments and divisions. Further, department-specific technologies may be applied to certain rules. For example, tax or payroll-based technology may be limited to a finance department or accounting department.

Further to detecting the set of technologies, the system 102 may extract a keyword and a set of buffer keywords from the user data. It may be noted that the keyword corresponds to at least one technology. Alternatively, the system may also extract a phrase corresponding to a technology. Further, the set of buffer keywords may comprise a plurality of words appearing before and after the keyword in the user data. In an example and not by way of any limitation, a user may set a value for the length of words appearing before and after the keyword that needs to be extracted. In the example, the user may set the buffer keyword length value as 5. Hence, the system 102 extracts 5 words appearing before and 5 words appearing after the keyword.

In an embodiment and not by way of any limitation, the system 102 may eliminate stop words (e.g. articles, prepositions, helping verbs, repeated words, misspelt words, and pronouns) present in the set of buffer keywords by using Natural Language Processing (NLP) techniques.

In an example, the system receives the user data comprising job titles, skills, and job summaries. An example of the user data reads as—"Experienced SAP Technical Lead with a demonstrated history of working in the information technology, banking and services industry. Skilled in SAP Basis, S4HANA, SAP ERP, PI/PO, BW/HANA/BPC, SAP BPA, BODS and SAP GRC, Oracle Database, Linux and Windows System Administration." In the above user data, the system identifies the term SAP®, Linux® and Oracle® as the keywords using a terms lookup mechanism and stores "SAP®," "Linux®," and "Oracle®" as the keywords. Further, let us assume that the buffer keyword length is set to 5. Then the system will extract five words before the keyword SAP® and five words after the keyword SAP®. Similarly, for the keyword Oracle® and Linux®. In the above example, the system may extract five sets of buffer keywords because the keyword SAP® appears five times. The set of buffer keywords is shown in the below table:

| Keyword | Set of buffer keywords appearing before the keyword | Set of buffer keywords appearing after the keyword |
|---|---|---|
| SAP ® (1$^{st}$ instance) | Experienced | Technical Lead with a demonstrated |
| SAP ® (2$^{nd}$ instance) | banking and services industry Skilled | Basis, S4HANA, SAP ERP, PI/PO |
| SAP ® (3$^{rd}$ instance) | Skilled in SAP Basis S4HANA | ERP PI/PO BW/HANA/BPC SAP BPA |
| SAP ® (4$^{th}$ instance) | S4HANA SAP ERP PI/PO BW/HANA/BPC | BPA BODS and SAP GRC |
| SAP ® (5$^{th}$ instance) | BW/HANA/BPC SAP BPA BODS and | GRC Oracle Database Linux and |
| Oracle ® | BPA BODS and SAP GRC | Database Linux and Windows System |
| Linux ® | and SAP GRC Oracle Database | and Windows System Administration |

Further to extracting the keywords, the system may determine a context of the user data based on the set of buffer keywords related to the keyword. It may be noted that the context of the set of buffer keywords is determined using a machine learning model. In an example and not by way of any limitation, the machine learning model used for the context determination may include at least one of a set of decision tree, random forest, k-nearest neighbour, support vector machines, naive Bayes classifier, and deep learning by constructing a neural network of multiple hidden layers. It may be noted that the machine learning model is used to build a context-aware model utilizing a given training dataset with contextual information, and then the resultant predictive model may be used for testing purposes.

In one embodiment, the training dataset may comprise a vector of the keyword and a dictionary having similar meanings as the keyword, labelled as ground-truth context into the keyword. The dictionary is represented in a vector space with distance vectors originating from the keyword for one or more words present in the dictionary. The machine learning model is trained to determine the context of the extracted set of buffer keywords corresponding to the keyword from the user data. The context is determined when at least a buffer keyword from the set of buffer keywords matches with one or more words present in the dictionary. It may be noted that the machine learning model is continuously under training and learning. The machine learning model is iteratively trained based on the user data.

Consider an example, the system receives user data comprising—"Development experience in C# NET 4.5 & knowledge of HTML, SQL." Further, the system determines the keyword (NET 4.5) and the set of buffer keywords appearing before and after the keyword. Let us assume that the pool of keywords of NET 4.5 comprises development, SQL, HTML, and framework. Further, the system determines the context as web development using the machine learning model.

Alternatively, the context of the user data may also be determined based on a mapping sheet comprising the dictionary having similar meanings as the keyword. The system may compare the dictionary with the set of buffer keywords. It may be noted that the context is determined when one or more keywords from the dictionary are matched with at least a keyword present in the set of buffer keywords. In the above example, let us assume that the mapping sheet comprises related keywords S4HANA, SAP ERP, PI/PO mapped to the technology SAP®. The system may determine that SAP® is being used in the context of an ERP platform.

Further to determining the context, the system may compare the keyword and the context with a predefined pattern sheet to determine a technology used by the user. The predefined pattern sheet comprises one or more prestored keyword patterns representing the technology. The predefined pattern sheet may be stored in any file format. Furthermore, the set of patterns for each technology is unique. The one or more predefined keyword patterns comprise at least a singular keyword pattern and Boolean keyword patterns. The Boolean keyword patterns comprise the keyword and one or more keywords related to the keyword used in combination with a set of logical operators. The set of logical operators comprises at least one of "AND," "OR," and "NOT" logical operators. It may be noted that the one or more keywords represent a predefined context for the technology.

In an embodiment, the system 102 may receive the predefined pattern sheet and the keywords related to the technology. Further, the system may detect false positives, using a machine learning model, when the extracted keyword is an ordinary English word or a generic word and not representative of a technology. It may be noted that in some instances, the system 102 may highlight certain English words and generic words which may or may not be related to the technology. The system 102 then allows a user to manually review the highlighted words to eliminate generic words from the predefined pattern sheet. In another embodiment, the system 102 may eliminate the generic patterns from the predefined pattern sheet automatically.

A pattern may be understood as a signature linked to specific technologies that may be used as unique identifiers for those linked technologies. No two technologies may have the same pattern unless the two technologies are related to the same product. In an example and not by way of any limitation, the system 102 may obtain the predefined pattern sheet from the memory 110. For example, and not by way of any limitation, communication technologies like Outlook®, Gmail®, etc. would have unique patterns associated with them. Likewise, video conferencing technologies like, Zoom®, Microsoft Teams®, Google Meet®, etc. would have unique patterns associated with them.

Such a comparison-based approach for the determination of the technologies reduces the requirement of large computational resources for determining technology used by the user. Further, such approaches, implemented by the system of the present subject matter, reduce the overall time required for the determination of the relevant technologies.

Consider an example, the system obtains user data comprising job titles, skills, and job summaries of a set of users. Further, the system extracts a keyword and a set of buffer keywords from the job summaries. Let us assume that there are 4000 unique users present in the user data. Further, let us assume that there are 5000 job summaries present in the user data. It may be noted that one user may have multiple job summaries.

Further, the system extracts keywords and a set of buffer keywords from the 5000 job summaries. In the example, let us assume that the system extracts 5 unique keywords and an associated set of buffer keywords from each job summary of the 5000 job summaries. Further, the system determines the context of the user data based on the set of buffer keywords related to the keyword. Finally, the system determines the technologies used by 4000 users. In an example, the system may display the list of users (4000 users) along with each user's experience in each technology and the company in which each user used that technology. For example and not by way of any limitation, the system may display technologies (technographics) used by the user in below manner:

| Name | Technology | Used in Company |
|------|-----------|-----------------|
| John Doe | SAP ® (5 years' experience) | Company A and Company B |
| | Oracle ® (3 years' experience) | Company B |
| | Salesforce ® (2 years' experience) | Company C |

Further to determining the technology used by the user, the system may validate the technology with the set of technologies. Let us assume that the system determines that user A, having a job title Human Resource (HR), uses Technology X, Technology Y, and Technology Z. Further, assume that the set of technologies for the job title HR comprises Technology X, Technology Y, Technology P, Technology Q, and Technology R. The system may validate that the determined technology by comparing with the set of technologies. Thus, the validated or matched technologies used by user A are Technology X and Technology Y. In the example and not by way of any limitation, the system may update database of the set of technologies by adding Technology Z.

In another embodiment, the system may determine an expertise of the user based on user's experience and a number of years spent on the technology. The system analyzes the user data to identify mentions of technologies or software products used during each job role. Further, the system may calculate the number of years the user has spent working with each technology by considering the duration of each job role. In an embodiment, the number of years may be determined by subtracting the start and end dates of each role. Let us assume that User A started working for a SaaS company in 2019 and used Technology A until 2021. Further, the user started working for another SaaS company and used Technology A until 2022. Thus, the system may determine that the user has three years of experience working in Technology A. Further, the system may assign expertise levels to the user based on the number of years spent on each technology based on a threshold. Let us assume that an administrator may define that 0-1 year of experience may fall under the beginner category. Similarly, 2-4 and 4+ are under an intermediate and an advanced category, respectively. The more years of experience a user has with the technology, the higher will be the expertise level.

In an alternate embodiment, the system may generate the set of technologies based on the user data by using a technology generation model. The technology generation model may be a machine learning model trained using a training dataset. The training dataset may comprise a list of technologies used by a plurality of users having same job titles and skills. The machine learning algorithm may be a supervised learning algorithm, such as a decision tree or neural network. The technology generation model may be used to associate the user data with the appropriate technologies.

In an embodiment, the system may provide automatic feedback to the technology generation model when the determined technology is not part of the set of technologies. Thus, updating database of the set of technologies. Further, the technology generation model may be continuously trained based on the automatic feedback and discovery of a new technology. In an embodiment, an administrator may update the set of technologies by adding new technologies.

In an embodiment, the system may compute a confidence score of the technology used by the user based on at least one of a time of detection of the technology, a frequency of detection of the technology, a source type, a number of sources, a number of courses completed by the user, a number of certificates obtained by the user, a job profile of the user, and experience of the user in the technology. The confidence score is a measure of accuracy of the determination of the technology used by the user. The higher the confidence score, the more certain the system is about the determination of the technology. In an embodiment, the confidence score may help in improving the accuracy of the system over time. By tracking the confidence score of its determinations, the system can identify patterns and adjust its algorithms or models to improve accuracy.

The time of detection of the technology: The system tracks the last time a technology was detected for a user. The more recent the detection, the higher the confidence score.

The source type: The system considers the type of source from which the technology was detected. For example, a technology detected from a job description may have a higher confidence score compared to a technology detected from a skills.

The number of sources: The system takes into account the number of sources from which the technology was detected. The more sources that detect the same technology, the higher the confidence score.

Relevant experience of the skill based on designation change: The system considers the relevance of the technology to the user's job role by tracking the user's designation change history. If the technology has been consistently detected throughout the user's job roles, it is likely to have a higher confidence score.

Mapping industry and skills: The system maps industry-specific technologies with the user's skills. For example, a software skill relevant to the SaaS industry may have a higher confidence score if the user has a job role in the SaaS industry.

Frequency of occurrence: The system considers the frequency of the technology being detected for a user. The more frequent the detection, the higher the confidence score.

In an embodiment, assume that a user used Technology X from 2010-2015 in company A. Further, the user started using Technology Y from 2015-2017. Let us assume that Technology X and Technology Y are related to software development. Further, the user started using Technology Z related to CRM between the year 2017-2022. Hence, the system may compute a lesser confidence score for Technology X and Technology Y than Technology Z because the user is no longer using Technology X and Technology Y.

In another embodiment, the system may determine an expertise of the user in the technology. The expertise may be determined based on the number of years a technology used by the user and a time when the technology was last used by the user.

In an example and not by way of any limitation, after determining the technology of the user, a business may build a strategy to approach the user (prospect for the business) using the determined technology.

Referring now to FIG. 2, an example 200 of the predefined pattern sheet is shown. The predefined pattern sheet comprises a list of technologies and one or more patterns corresponding to the technology. It may be noted that the pattern may be at least a singular pattern and a Boolean pattern. The Boolean pattern comprises the keyword and the one or more keywords related to the keyword used in combination with a set of logical operators. The one or more keywords represent a predefined context for the technology. In the figure, it may be seen that Technology A has three patterns wherein the pattern 2 and pattern 3 are associated with a context. For example, pattern 3 represents technology A in the context of the supply chain and the pattern 2 represents technology A in the context of logistics. It may be noted that when technology A is used in the context of either supply chain or logistics, the system will determine that technology A is being used by the company. Technology D is related to electronics and, more particularly related to robotics. Further, pattern 4 of Technology D depicts that Technology D when found in combination with supply chain and logistics is not relevant because there may exist a technology having the same name but a different business.

Referring now to FIG. 3, a method 300 for determining a technology used by a user is shown, in accordance with an embodiment of the present subject matter. The method 300 may be described in the general context of computer executable instructions. Generally, computer executable instructions may include routines, programs, objects, components, data structures, procedures, modules, functions, etc., that perform particular functions or implement particular abstract data types.

The order in which the method 300 is described is not intended to be construed as a limitation, and any number of the described method blocks may be combined in any order to implement the method 300 or alternate methods for determining technographics used by a user. Additionally, individual blocks may be deleted from the method 300 without departing from the scope of the subject matter described herein. Furthermore, the method 300 for determining a technology used by a user may be implemented in any suitable hardware, software, firmware, or combination thereof. However, for ease of explanation, in the embodiments described below, the method 300 may be considered to be implemented in the above-described system 102.

At block 302, user data comprising job titles, skills, and job summaries may be received. The user data may be received from a plurality of sources comprising articles and reports.

At block 304, technology categorization data may be identified based on the user data. The technology categorization data may comprise a technology category and a technology subcategory mapped to a user department and a user division. The technology categorization data may be prestored.

At block 306, a set of technologies mapped to at least one of the technology category and the technology subcategory may be detected.

At block 308, a keyword and a set of buffer keywords may be extracted from the user data. The keyword may correspond to a technology.

At block 310, a context of the user data may be determined based on the set of buffer keywords of the keyword.

At block 312, the keyword and the context may be compared with a predefined pattern sheet to determine the technology used by the user. The predefined pattern sheet may comprise one or more prestored keyword patterns representing the technology.

At block 314, the technology may be validated with the set of technologies.

Figure 4:
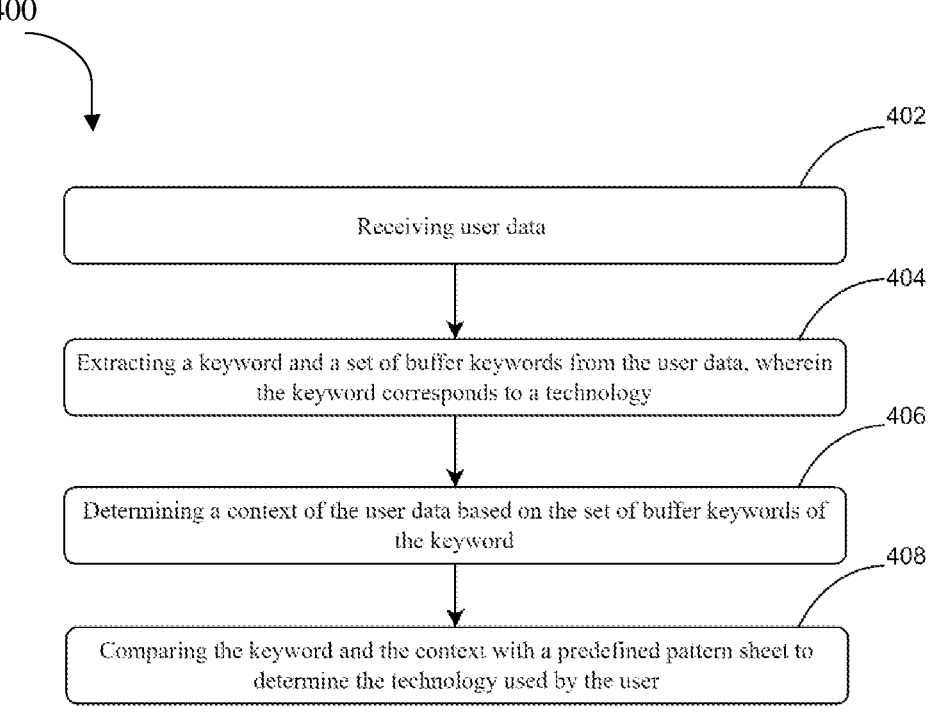
FIG. 4 illustrates another method for determining a technology used by a user, in accordance with an embodiment of the present subject matter.

Referring now to FIG. 4, a method 400 for determining a technology used by a user is shown, in accordance with an embodiment of the present subject matter. The method 400 may be described in the general context of computer-executable instructions. Generally, computer-executable instructions may include routines, programs, objects, components, data structures, procedures, modules, functions, etc., that perform particular functions or implement particular abstract data types.

At block 402, user data comprising job titles, skills, and job summaries may be received. The user data may be received from a plurality of sources comprising articles, and reports.

At block 404, a keyword and a set of buffer keywords may be extracted from the user data. The keyword may correspond to a technology.

At block 406, a context of the user data may be determined based on the set of buffer keywords of the keyword.

At block 408, the technology used by the user may be determined upon comparing the keyword and the context with a predefined pattern sheet. The predefined pattern sheet comprises one or more prestored keyword patterns representing the technology.

Figure 5:
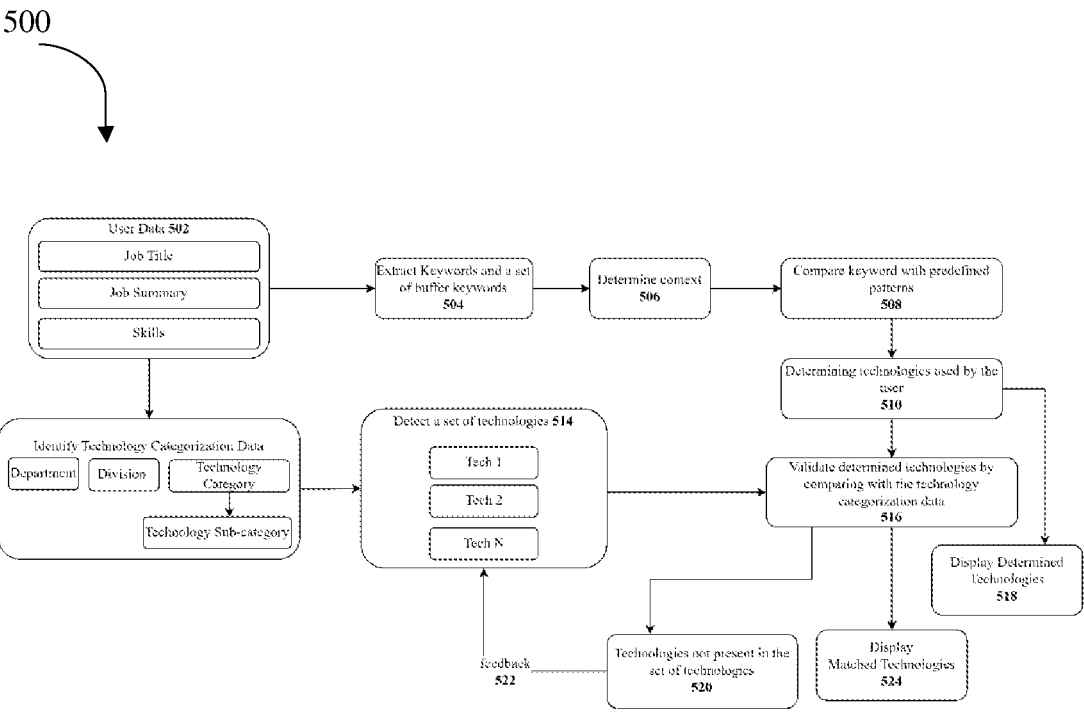
FIG. 5 is a block diagram illustrating an example for determining a technology used by a user, in accordance with an embodiment of the present subject matter.

Referring to FIG. 5, a method 500 for determining a technology used by a user is shown, in accordance with an embodiment of the present subject matter. The method 500 may be described in the general context of computer-executable instructions. Generally, computer-executable instructions can include routines, programs, objects, components, data structures, procedures, modules, functions, etc., that perform particular functions or implement particular abstract data types.

The method may comprise receiving user data 502 comprising job titles, skills, and job summaries. Subsequently, technology categorization data 514 may be identified based on the user data 502. It may be noted that the technology categorization data 514 comprises a technology category and a technology subcategory mapped to a user department and a user division. The technology categorization data is prestored.

Parallelly, a keyword and a set of buffer keywords 504 may be extracted from the user data 502. It may be noted that the keyword corresponds to a technology. Subsequently, a context 506 of the user data based on the set of buffer keywords of the keyword may be determined. Further, the keyword and the context with a predefined pattern sheet may be compared 508 to determine the technology 510 used by the user. The predefined pattern sheet may comprise one or more prestored keyword patterns representing the technology. Furthermore, the technology may be validated 516 by comparing the technology 510 with the technology categorization data 514.

Further, the determined technologies 510 may be displayed 518 as a final output to the user. In an embodiment, when the determined technologies match with one or more technology from the set of technologies, the system may display such technologies as matched technologies 524. When the determined technologies 510 do not match with the detected set of technologies 514, the determined technologies are provided as a feedback 522 to the set of technologies 512. This helps to continuously improve database of the set of technology 514 over a period of time. In yet another embodiment, the system also displays the detected set of technologies 514 based on the user data 502.

In an example, consider that the job title of the user is UI/UX developer. Further, technology categorization data may be identified based on the job title. Let us assume that the technology categorization data identifies a technology category as Designing and a technology sub-category as Web-Designing. Further, a prestored set of technologies mapped to the technology sub-category may be fetched. In the example, technologies may be Figma®, Wordpress®, Canva®, Photoshop®, Adobe XD® and alike. In an embodiment, the system may display all the technologies mapped to the technology sub-category.

Figure 6:
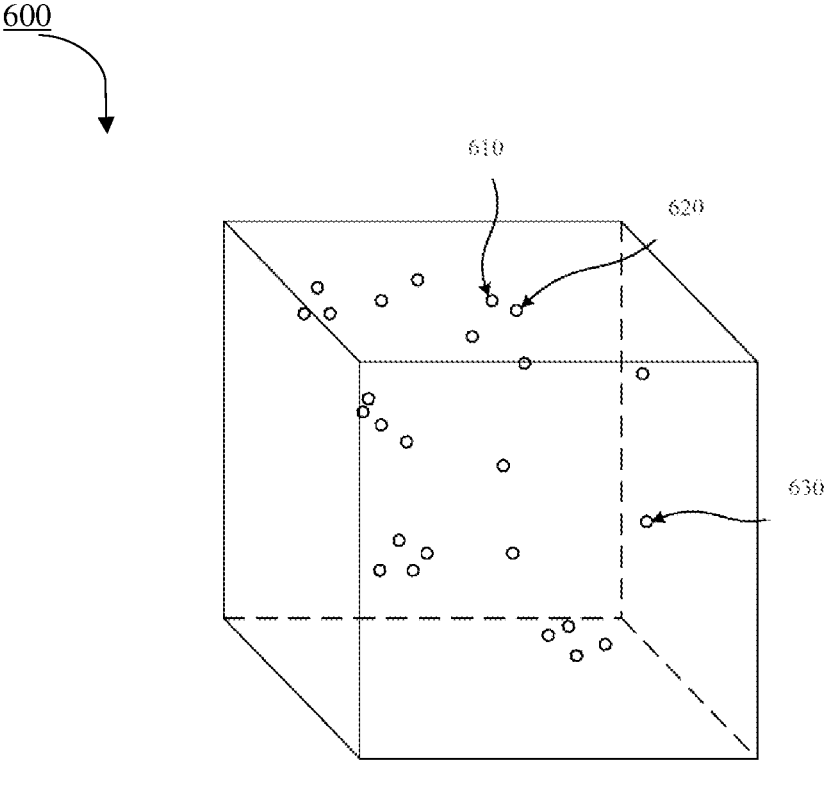
FIG. 6 illustrates an example view of an embedding space, in accordance with an embodiment of the present subject matter.

Referring to FIG. 6, the system 102 may create vector space between the keyword and the set of buffer keywords. Further, distance between the keyword and the set of buffer keywords may be determined in order to match whether the keyword and the set of buffer keywords are within a threshold distance from each other in terms of a similarity metric. The system may calculate a similarity metric of vectors in vector space 600. A similarity metric may be a cosine similarity, a Minkowski distance, a Mahalanobis distance, a Jaccard similarity coefficient, or any suitable similarity metric. The similarity metric of two vectors may represent how similar the two objects or n-grams corresponding to the two vectors, respectively, are to one another, as measured by the distance between the two vectors in the vector space 600.

In an example and not by way of any limitation, let us assume that keyword is technology P, and the set of buffer keywords are group collaboration, project management, and health management. The system may create the vector space between technology P and group collaboration, project management, and health management. In the example, the distance between the technology P and group collaboration, similarly, technology P and project management may be within the predefined threshold.

As an example, and not by way of limitation, vector 610 (technology P) and vector 620 (group collaboration) may correspond to objects that are more similar to one another than the objects corresponding to vector 610 (technology P) and vector 630 (health management), based on the distance between the respective vectors. Although this disclosure describes calculating a similarity metric between vectors in a particular manner, this disclosure contemplates calculating a similarity metric between vectors in any suitable manner.

FIG. 7 illustrates an example artificial neural network ("ANN") 700 of the deep learning algorithms. In particular embodiments, an ANN may refer to a computational model comprising one or more nodes. Example ANN 700 may comprise an input layer 710, hidden layers 720, 730, 740, and an output layer 750. Each layer of the ANN 700 may comprise one or more nodes, such as a node 705 or a node 715. In particular embodiments, each node of an ANN may be connected to another node of the ANN. As an example, and not by way of limitation, each node of the input layer 710 may be connected to one of more nodes of the hidden layer 720. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 7 depicts a particular ANN with a particular number of layers, a particular number of nodes, and particular connections between nodes, this disclosure contemplates any suitable ANN with any suitable number of layers, any suitable number of nodes, and any suitable connections between nodes. As an example, and not by way of limitation, although FIG. 7 depicts a connection between each node of the input layer 710 and each node of the hidden layer 720, one or more nodes of the input layer 710 may not be connected to one or more nodes of the hidden layer 720.

In particular embodiments, an ANN may be a feedforward ANN (e.g., an ANN with no cycles or loops where communication between nodes flows in one direction, beginning with the input layer and proceeding to successive layers). As an example, and not by way of limitation, the input to each node of the hidden layer 720 may comprise the output of one or more nodes of the input layer 710. As another example and not by way of limitation, the input to each node of the output layer 750 may comprise the output of one or more nodes of the hidden layer 740. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example, and not by way of limitation, the input into residual block N may be $F(x)+x$, where $F(x)$ may be the output of residual block $N-1$, x may be the input into residual block $N-1$. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example, and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example, and not by way of limitation, a connection 725 between the node 705 and the node 715 may have a weighting coefficient of 0.4, which may indicate that 0.4 multiplied by the output of the node 705 is used as an input to the node 715. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example, and not by way of limitation, training data may comprise inputs to the ANN 700 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example, and not by way of limitation, a training method may be used (e.g., the conjugate gradient method, the gradient descent method, the stochastic gradient descent) to backpropagate the sum-of-squares error measured as a distance between each vector representing a training object (e.g., using a cost function that minimizes the sum-of-squares error). In particular embodiments, the ANN may be trained using a dropout technique. As an example, and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method generate insights related to technologies being used by the user.

Some embodiments of the system and the method help an organization understand buyer behaviour and pain points using buyer journeys and technographic insights.

Some embodiments of the system and the method assist the organization to identify accurate leads for a particular product or service.

Although implementations for methods and systems for determining technologies used by a user have been described in language specific to structural features and/or methods, it is to be understood that the appended claims are not necessarily limited to the specific features or methods described. Rather, the specific features and methods are disclosed as examples of implementations for determining technographics used by a user.

The invention claimed is:

1. A method to determine a technology used by a user, the method comprises:

receiving, by a processor, a training dataset comprising a vector representation of a keyword and a dictionary including one or more words semantically similar to the keyword, in a shared embedding space;

training, by the processor, a machine learning model for determining contextual relationships between the keyword and the one or more words, and determining one or more false positive keywords in extracted keywords;

wherein the training for determining the contextual relationships comprises:

learning semantic relationships between the keyword and the one or more words in the dictionary based on distances between their respective vector representations in the embedding space; and determining, using the learned semantic relationships, contextual relationships for the keyword based on a set of contextual keywords within the training dataset, when at least one contextual keyword matches the one or more words in the dictionary;

wherein training for determining the one or more false positive keywords in extracted keywords comprises:

receiving a predefined pattern sheet and one or more keywords related to one or more technologies;

identifying, in the received one or more keywords, one or more keywords that are ordinary English words or generic terms and are not representative of a technology in the context of received user data; and refining, the machine learning model by training using the identified generic or ordinary English words and the technology-related keywords as negative and positive examples, respectively, to enable the machine learning model to recognize patterns associated with false positives and non-technology-representative terms;

receiving, by the processor, data associated with a set of users from structured and unstructured sources, wherein the data comprises information related to job titles, skills, and job summaries related to each user of the set of users, and wherein each user is associated with a plurality of job summaries;

identifying, by the processor, technology categorization data for each user based on the received data associated with the set of users, wherein the technology categorization data comprises a technology category and a technology subcategory;

detecting, by the processor:

a first set of technologies, mapped to at least one of the technology category and the technology subcategory; and a second set of technologies not mapped to the at least one of the technology category and the technology subcategory;

extracting, by the processor, a keyword and a set of contextual keywords from the user data, wherein the keyword corresponds to a technology;

determining, by the processor, a context by applying the trained machine learning model to the extracted keyword and the set of contextual keywords;

comparing, by the processor, the extracted keyword and the determined context with a predefined pattern sheet, stored in a database, comprising one or more prestored keyword patterns, each keyword representing a respective technology, wherein the comparing includes:

retrieving, by the processor, one or more prestored keyword patterns from the predefined pattern sheet, each keyword pattern representing a respective technology;

determining, by the processor, a match between the extracted keyword and the determined context with at least one keyword pattern from the predefined pattern sheet to identify a technology;

detecting, by the processor, whether the extracted keyword is a false positive by applying the machine learning model, wherein the extracted keyword is determined to be a false positive when it is an ordinary English word or a generic term that is not representative of a technology in the context of the received data; and eliminating, by the processor, the technology identified from the matched keyword pattern when the extracted keyword is determined to be the false positive or when the matched keyword pattern includes a negation context indicating that the extracted keyword is not relevant in the determined context;

validating, when no false positive is detected, by the processor, the technology with the set of technologies, wherein the validation includes the generation of feedback signal when no pattern-validated technology remains for a given user after the elimination or the identified technology fails the validation;

updating, by the processor, the database, by adding the second set of technologies; and providing an automatic feedback to the machine learning model to re-train the machine learning model using the updated database, wherein the machine learning model is continuously trained to maintain contextual awareness of new technologies and contextual accuracy over time; and wherein the machine learning model is continuously trained based on the detected generic terms, thereby improving the accuracy of detecting false positives and eliminating generic patterns.

2. The method as claimed in claim 1, wherein the job title is mapped to the technology categorization data.

3. The method as claimed in claim 1, wherein the set of buffer keywords comprises a plurality of words appearing before and after the keyword in the user data.

4. The method as claimed in claim 1, further comprises computing a confidence score of the technology based on at least one of a time of detection of the technology, a frequency of detection of the technology, a source type, a number of sources, an experience of the user in the technology.

5. The method as claimed in claim 1, wherein the technology categorization data is prestored.

* * * * *